United States Patent
Kim

[11] Patent Number: 5,872,509
[45] Date of Patent: Feb. 16, 1999

[54] DEVICE FOR SENSING THE AMOUNT OF OIL IN OIL PANS

[75] Inventor: Gyu Wan Kim, Seoul, Rep. of Korea

[73] Assignee: Hyundai Motor Company, Seoul, Rep. of Korea

[21] Appl. No.: 946,128

[22] Filed: Oct. 7, 1997

[30] Foreign Application Priority Data

Oct. 7, 1996 [KR] Rep. of Korea ............... 1996/32914

[51] Int. Cl.⁶ .................................................. B60Q 1/00
[52] U.S. Cl. .................. 340/450.3; 340/623; 340/693; 73/308; 73/309; 200/84 R
[58] Field of Search ............... 340/450, 450.3, 340/438, 459, 612, 618, 623, 624, 693; 73/305, 307, 308, 309; 200/84 R

[56] References Cited

U.S. PATENT DOCUMENTS

| | | | |
|---|---|---|---|
| 3,949,360 | 4/1976 | Pignata et al. ................... | 340/450.3 |
| 4,721,941 | 1/1988 | Robine, Jr. et al. ............... | 340/450.3 |
| 5,196,824 | 3/1993 | Helm ................................. | 340/450.3 |
| 5,224,379 | 7/1993 | Koebernik et al. ................ | 73/308 |

*Primary Examiner*—Daniel J. Wu
*Attorney, Agent, or Firm*—Birch, Stewart Kolasch & Birch, LLP

[57] ABSTRACT

A device for sensing the amount of oil in oil pans of internal combustion engines is disclosed. In the device, a bottom plunger is fixedly mounted onto the inside bottom of an oil pan, with a contact terminal being mounted onto the top surface of the bottom plunger. A top plunger is movably positioned above the bottom plunger, with a contact terminal being mounted onto the bottom surface of the top plunger. The two contact terminals are normally spaced apart from each other in the event of the amount of oil being not less than a preferred amount. However, the two terminals are selectively brought into contact with each other in the event of an oil shortage in the oil pan. The device also has a means for selectively generating an alarm signal under the control of an ECU in the event of the two terminals being brought into contact with each other.

3 Claims, 2 Drawing Sheets

5,872,509

DEVICE FOR SENSING THE AMOUNT OF OIL IN OIL PANS

BACKGROUND OF THE INVENTION

1. Field of the Invention

The present invention relates, in general, to an oil level sensing device for sensing the amount of oil in an oil pan of an internal combustion engine and, more particularly, to an oil level sensing device capable of simply informing a driver in a driver's seat of an oil shortage by selectively generating an alarm signal when the amount of oil in the oil pan is reduced to less than a preferred amount.

2. Description of the Prior Art

As well known to those skilled in the art, internal combustion engines for automobiles are individually provided with an oil pan, which is used for storing engine oil therein. In order to check the amount of oil in such an oil pan, the oil pan is provided with an oil level checking device. FIG. 3 shows the construction of a typical oil level checking device for oil pans. As shown in the drawing, the typical device for checking the amount of oil in an oil pan 2 is comprised of an oil guide pipe 3, which is vertically positioned in the oil pan 2. An oil checking rod 4, which is used for checking the amount of oil in the oil pan 2, is detachably inserted in the guide pipe 3, thus being selectively pulled out from the pipe 3.

Two points, that is, top and bottom points 4a and 4b, are marked on the oil checking rod 4, with an interval being formed between the two points 4a and 4b. In order to check the amount of oil in the oil pan 2, the oil checking rod 4 is pulled out from the guide pipe 3 prior to checking the position or the height of oil line on the oil checking rod 4.

That is, a driver, who wants to check the amount of oil in the oil pan 2, pulls the oil checking rod 4 from the guide pipe 4 of the oil pan 2 and checks the amount of oil by determining the position of oil adhering to the rod 4 between the two points 4a and 4b. In such a case, when the height line of oil adhering onto the rod 4 is positioned between the two points 4a and 4b, the amount of oil in the oil pan 2 is acceptable, thus being free from any necessity of addition or change of engine oil. Meanwhile, when the height line of oil on the rod 4 fails to reach at least the bottom point 4b, engine oil has to be added or changed. On the other hand, the engine oil in the oil pan 2 may be changed with new oil after checking the turbidity of the oil. In order to check the turbidity of the oil, it is necessary to determine the color of the oil adhering onto the rod 4 after pulling the rod 4 from the guide pipe 3.

However, such an oil level checking device is problematic in that a driver, who wants to determine whether the engine oil has to be added or changed, has to manually pull the oil checking rod 4 from the guide pipe 3 of the oil pan 2.

SUMMARY OF THE INVENTION

Accordingly, the present invention has been made keeping in mind the above problems occurring in the prior art, and an object of the present invention is to provide an oil level sensing device for oil pans of internal combustion engines, which is capable of simply informing a driver in a driver's seat of an oil shortage by selectively generating an alarm signal when the amount of oil in an oil pan is reduced to less than a preferred amount.

In order to accomplish the above object, the present invention provides a device for sensing the amount of oil in an oil pan, comprising: a bottom plunger fixedly mounted onto the inside bottom of the oil pan, the bottom plunger having a top contact terminal on its top surface; a top plunger movably positioned above the bottom plunger, thus being movable relative to the bottom plunger in a vertical direction, the top plunger having a bottom contact terminal on its bottom surface, thus normally allowing the top and bottom contact terminals to be spaced apart from each other in the event of the amount of oil in the oil pan being not less than a preferred amount and selectively allowing the two contact terminals to be brought into contact with each other in the event of an oil shortage in the oil pan; and means for selectively generating an alarm signal under the control of an electronic control unit in the event of the two contact terminals being brought into contact with each other.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
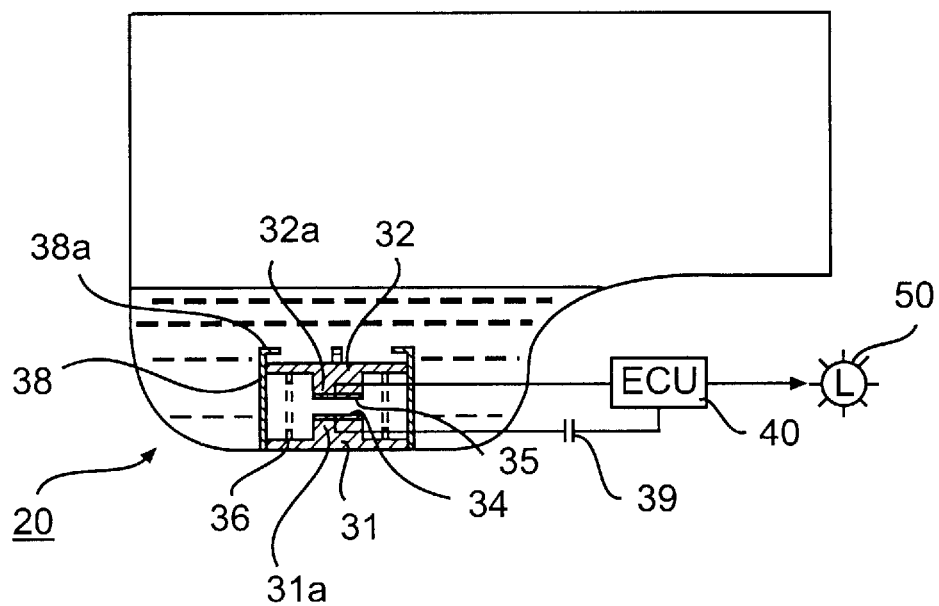
FIG. 1 is a sectional view showing the construction of an oil level sensing device for oil pans in accordance with the preferred embodiment of the present invention.
Figure 2:
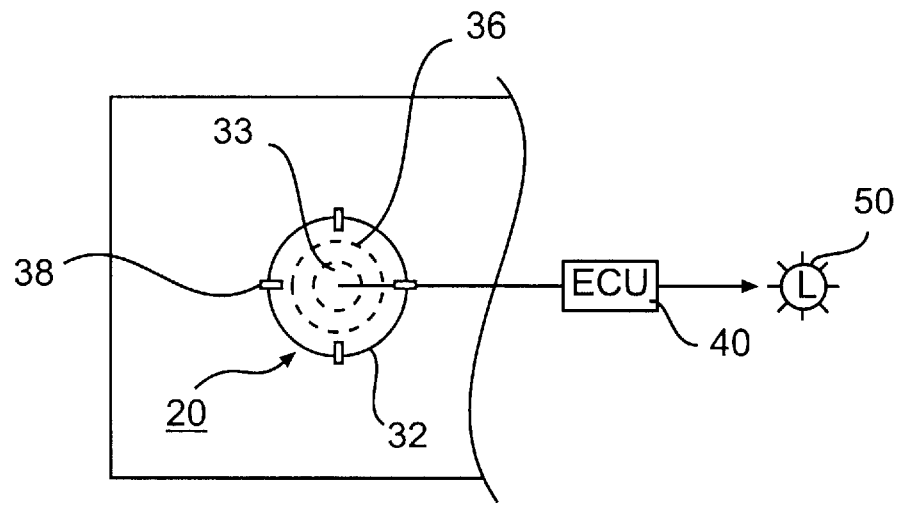
FIG. 2 is a plan view of the sensing device of this invention.
Figure 3:
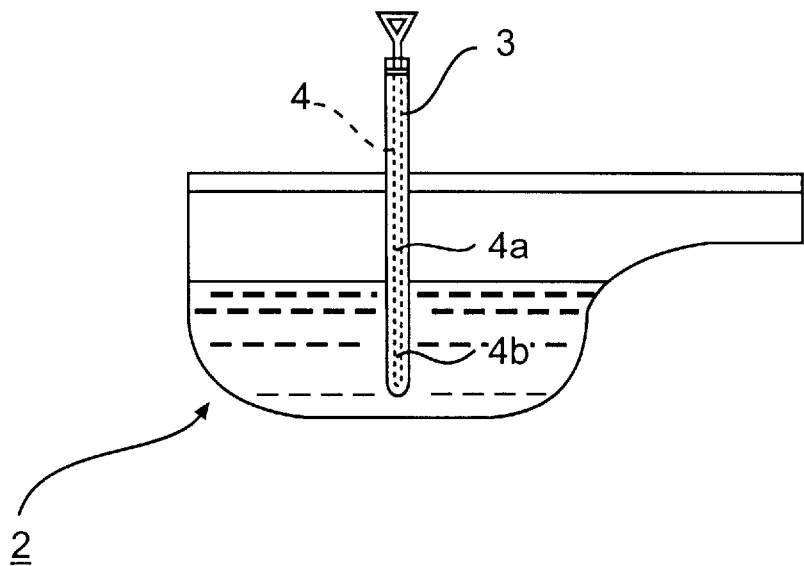
FIG. 3 is a view showing the construction of a typical oil level checking device for oil pans.

FIGS. 1 and 2 show the construction of an oil level sensing device for oil pans in accordance with the preferred embodiment of this invention. As shown in the drawings, the oil level sensing device of this invention is comprised of two plungers, that is, bottom and top plungers 31 and 32 which are interiorly installed on the bottom of an oil pan 20 so as to be opposite each other.

The bottom plunger 31 is fixedly mounted onto the inside bottom of the oil pan 20, with a top protrusion 31a being formed on the top center of the bottom plunger 31. Attached onto the top surface of the top protrusion 31a is a top contact terminal 34. Meanwhile, the top plunger 32 is movably positioned above the bottom plunger 31, thus being movable relative to the bottom plunger 31 in a vertical direction. The top plunger 32 is provided with a bottom protrusion 32a on its bottom center. A bottom contact terminal 35 is attached onto the bottom surface of the bottom protrusion 32a.

A plurality of regularly-spaced guide columns 38 are vertically positioned around the bottom plunger 31, with the top plunger 32 being positioned inside the columns 38 at a position above the bottom plunger 31 and being movable relative to the bottom plunger 31 under the guide of the columns 38. Each of the guide columns 38 is bent to the inside at its top end, thus forming a top stopper 38a used for preventing the top plunger 32 from being unexpectedly removed from the guide columns 38.

When the amount of oil in the oil pan 20 is not less than an acceptable preferred amount, the top plunger 32 is immersed in the oil, thus floating in the oil due to buoyancy. In such a case, the contact terminal 35 of the top plunger 32 is spaced apart from the contact terminal 34 of the bottom plunger 31. Meanwhile, when the amount of oil in the oil pan 20 is reduced to less than the preferred amount, the surface of oil in the pan 20 is lowered to a position under the top plunger 32. In such a case, the oil fails to give any buoyancy to the top plunger 32, thus causing the plunger 32 to be lowered by its own weight with the contact terminal 35 of the top plunger 32 being brought into contact with the contact terminal 34 of the bottom plunger 31.

The two contact terminals 34 and 35 may unexpectedly come into contact with each other due to vibrations of a car even when the amount of oil in the oil pan 20 is not less than the preferred amount. In order to prevent such an unexpected contact of the two terminals 34 and 35, a suspension means is positioned between the two plungers 31 and 32. In the preferred embodiment, the suspension means is a compression coil spring 36, which is interposed between the two plungers 31 and 32 and always and slightly biases the top plunger 32 upwardly.

However, it should be understood that the elastic modulus of the coil spring 36 has to allow the top plunger 32 to be smoothly lowered onto the bottom plunger 31 while compressing the spring 36 with the two contact terminals 34 and 35 of the plungers 31 and 32 being brought into contact with each other when the amount of oil in the oil pan 20 is less than the preferred amount.

The contact terminal 34 of the bottom plunger 31 is connected to one electrode of a power source 39, while the contact terminal 35 of the top plunger 32 is connected to an ECU (electronic control unit) 40. The ECU 40 is connected to both the other electrode of the power source 39 and an alarm means 50, thus forming an electric circuit of the device.

In the operation of the oil level sensing device of this invention, the electric circuit is turned on with the two terminals 34 and 35 being brought into contact with each other due to an oil shortage in the oil pan 20. In such a case, electric current of the power source 39 flows in the circuit so that the ECU 40 detects the electric current prior to outputting a control signal for the alarm means 50. In response to the control signal from the ECU 40, the alarm means 50 generates an alarm signal, thus informing a driver of such an oil shortage in the oil pan 20.

As described above, the present invention provides an oil level sensing device for oil pans of internal combustion engines. When the amount of oil in an oil pan is reduced to less than a preferred amount, the device automatically generates an alarm signal and effectively informs a driver in a driver's seat of an oil shortage. Therefore, the device of this invention is convenient to a driver while driving a car.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for sensing the amount of oil in an oil pan, comprising:

a bottom plunger fixedly mounted onto the inside bottom of said oil pan, said bottom plunger having a top contact terminal on its top surface;

a top plunger movably positioned above said bottom plunger, thus being movable relative to the bottom plunger in a vertical direction, said top plunger having a bottom contact terminal on its bottom surface, thus normally allowing the top and bottom contact terminals to be spaced apart from each other in the event of the amount of oil in said oil pan being not less than a preferred amount and selectively allowing the two contact terminals to be brought into contact with each other in the event of an oil shortage in the oil pan; and means for selectively generating an alarm signal under the control of an electronic control unit in the event of the two contact terminals being brought into contact with each other.

2. The device according to claim 1, further comprising:

means for biasing said top plunger upwardly, thus preventing the two contact terminals from unexpectedly coming into contact with each other, said biasing means being provided between said top and bottom plungers.

3. The device according to claim 1, further comprising:

a plurality of guide columns vertically positioned around said bottom plunger and adapted for guiding a vertical movement of said top plunger.

\* \* \* \* \*